UNITED STATES PATENT OFFICE.

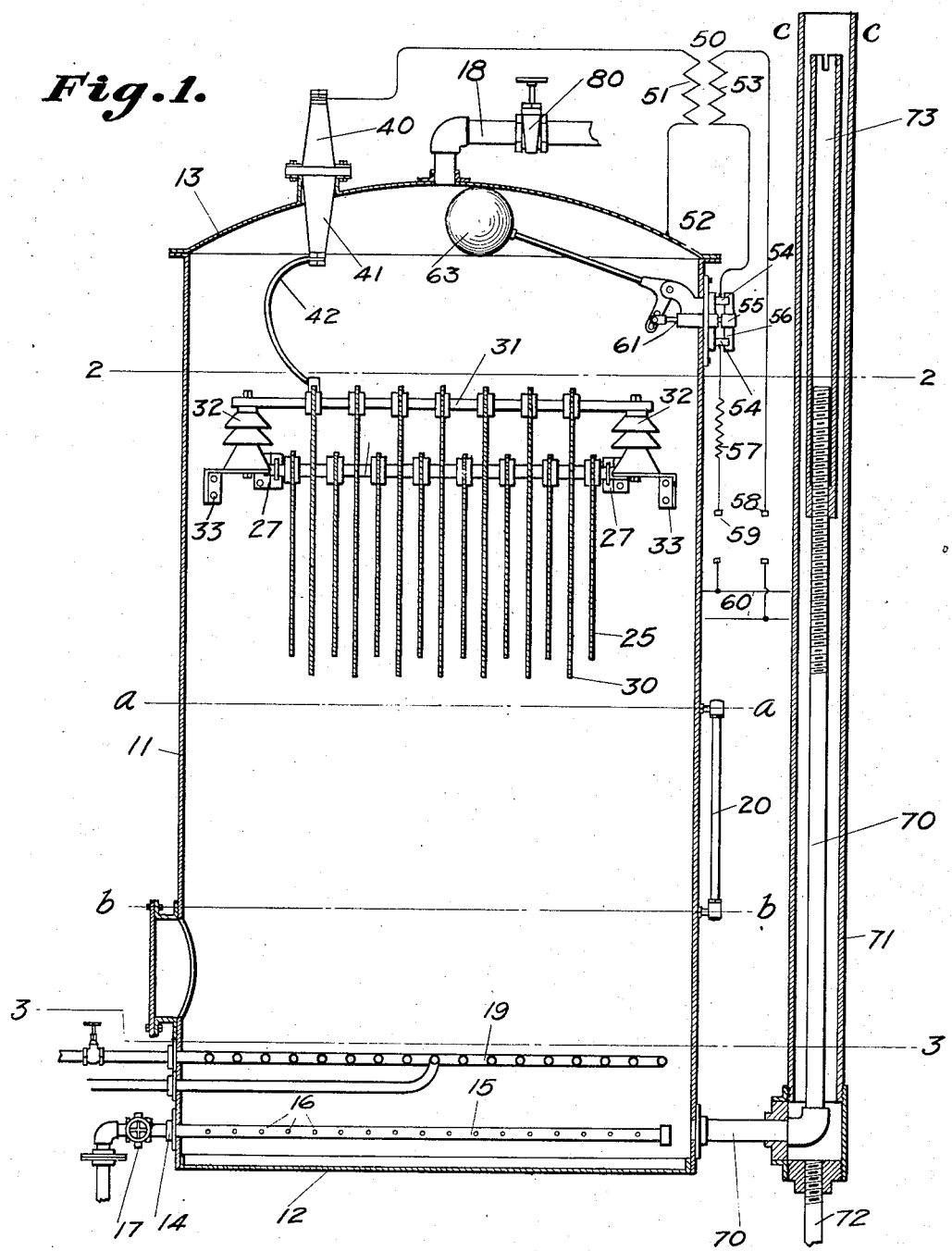

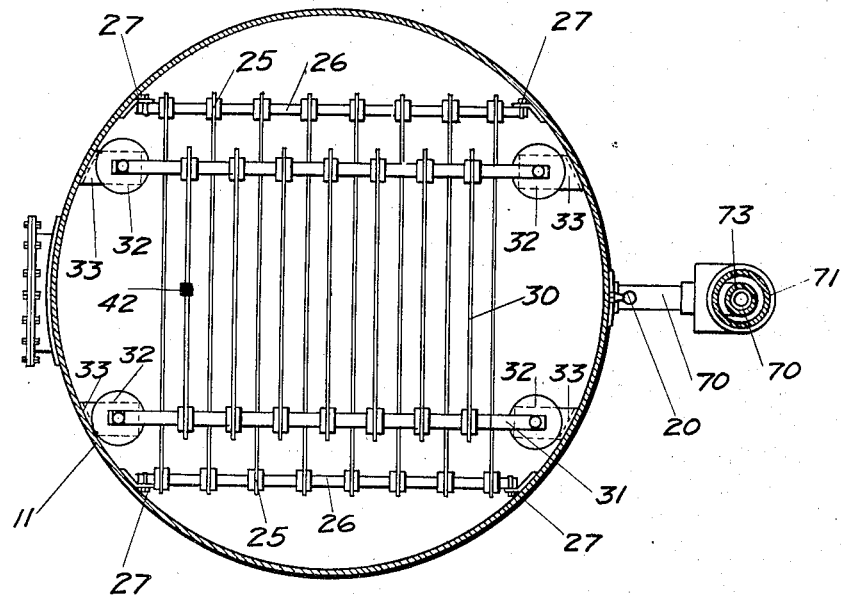
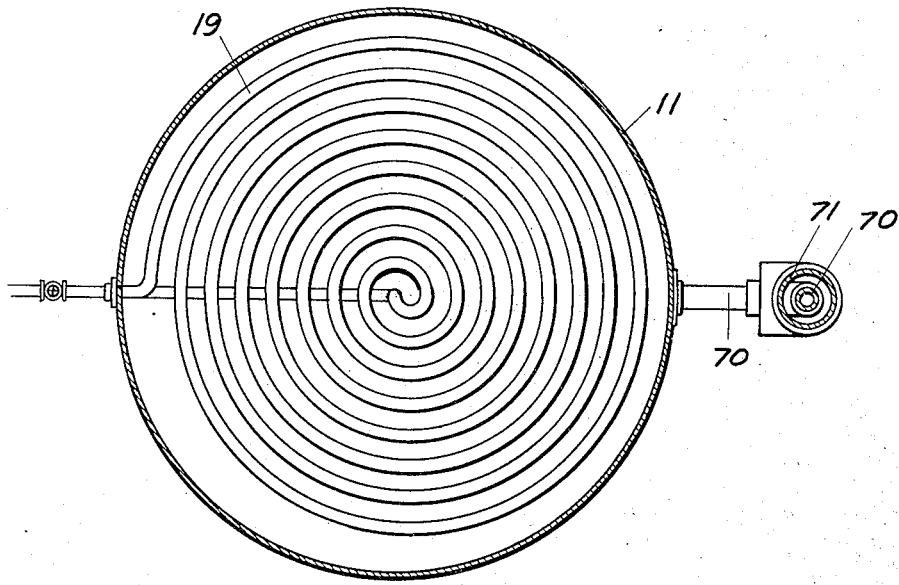

FORD W. HARRIS, OF LOS ANGELES, CALIFORNIA, ASSIGNOR, BY MESNE ASSIGNMENTS, TO PETROLEUM RECTIFYING COMPANY, OF SAN FRANCISCO, CALIFORNIA, A CORPORATION OF CALIFORNIA.

DEHYDRATOR.

1,405,121.   Specification of Letters Patent.   Patented Jan. 31, 1922.

Continuation of application Serial No. 261,728, filed November 7, 1918. This application filed September 18, 1919. Serial No. 324,686.

*To all whom it may concern:*

Be it known that I, FORD W. HARRIS, a citizen of the United States, residing at Los Angeles, in the county of Los Angeles and State of California, have invented a new and useful Dehydrator, of which the following is a specification.

My invention relates to the art of dehydrating petroleum emulsions. Petroleum oils as found in nature often contain water which may be arbitrarily classified as "free" water or "trapped" water. It is common practice in the art to allow the oil to stand in sumps or in tanks for the purpose of allowing the water to settle out, and a great deal of the water found in the oil may be so separated. It is common practice in the art to designate the water which will be settled out by gravity within a few days as "free" water.

In addition to the free water there is often a considerable quantity of water in the oil which will not settle out within a reasonable time, this water being found in the form of small or even microscopic particles or globules. This emulsified water may be conveniently designated as "trapped" water. There is of course no sharp line of demarcation between trapped water and free water, the water often being found in all sizes of globules from the microscopically minute to particles which are easily visible to the naked eye.

This application is a continuation of my application Serial No. 261,728, filed Nov. 7, 1918.

Further objects and advantages will be made evident hereinafter.

Referring to the drawings, which are for illustrative purposes only,

Fig. 1 is a sectional elevation of my invention.

Fig. 2 is a plan on line 2—2 of Fig. 1 as viewed from above.

Fig. 3 is a plan on line 3—3 of Fig. 1 as viewed from above.

In the form of my invention illustrated in the drawing I provide a tank 11 having a tight bottom 12 and a tight top 13. Secured in a flange 14, near the bottom thereof, is a pipe 15 which extends across the tank and is provided with a plurality of small openings 16. The flow of oil through the inlet pipe is controlled by a valve 17. An outlet pipe 18 is provided at the apex of the top 13 which may be conveniently of cylindrical or conical contour. A steam coil 19 may be placed inside the tank directly above the inlet pipe 15 and a water gauge 20 may be placed on the side of the tank for indicating differences in oil level between planes *a—a* and *b—b*.

Secured considerably above the plane *a—a*, which represents the maximum water level, is a plurality of grounded electrodes 25, the electrodes shown being flat plates secured on pipe members 26 carried in suitable brackets 27 fixed to the tank. All the plates 25 are mechanically and electrically connected together and form what may be termed the grounded electrode. A plurality of plates 30 are supported on pipe members 31 which are carried on insulators 32 which are in turn carried on suitable members 33 fixed to the tank. The plates 30 are mechanically and electrically connected together and form what may be termed the live electrode. The plates 30 extend downwardly parallel to and equally spaced from the plates 25, forming with the plates 25 an electric field in which the dehydration is carried on.

An insulator 40 is secured in the top of the tank, this insulator being preferably formed of porcelain and being pressure tight, a conductor passing therethrough and being connected through a wire 42 with the plates 30. A transformer 50 is provided, the high tension secondary 51 thereof being connected at one side to the tank 11 at 52, and at the other side to the conductor 41. The primary 53 of this transformer is connected to one of the stationary contacts 54 of a safety switch 55. This safety switch is provided with a bridging contact 56 which connects the two stationary contacts 54 together. The other contact 54 is connected to a resistance 57. The resistance 57 and the other side 58 of the primary 53 are connected to a control switch 59 by means of which they may be connected to supply mains 60. The bridging contact 56 is operated by means of a rod 61 which passes through a stuffing box in the side of the tank and is operated by a float 63, the bridging contact 56 being pulled into contact with the members 54 when the float assumes its extreme top position. This float is so placed that it rises to the highest part of the tank and tends to open the circuit between the contacts 54 at all times that the tank is not entirely filled with liquid by moving the bridge member 56.

A water outlet 70 is provided, this water outlet rising inside a drain column 71 which is connected to a drain 72 and being provided at its upper end with a long threaded sleeve 73 which can be moved up and down on the pipe 70 so as to change the upper level of the sleeve 73 as shown at c—c. A valve 80 is placed in the pipe 18, by means of which pressure may be maintained on the tank 11.

The method of operation of my invention is as follows:

Oil under pressure is delivered through the valve 17 to the interior of the pipe and passes through the perforations 16 therein, rising through a body of water which has been placed in the bottom of the tank, the level of this water being easily observed by means of the gauge glass 20 and the height thereof being regulated by the members 70 to 73 somewhere between the levels a—a and b—b, as will hereinafter be explained. This entering oil may contain both free and trapped water. The body of water into which the oil is injected is preferably heated by means of the steam coil 19 to facilitate the separation of the free water from the oil, this separation taking place as the oil rises through the body of water, the purposes of the perforations 16 being to finely divide the oil into a plurality of small streams from which the free water particles readily separate, attaching themselves to the body of water and forming a portion thereof. If for any reason water alone is supplied through the valve 17 it simply becomes a part of the body of water in the bottom of the tank, the height of this water being automatically regulated as will hereinafter be explained.

The plates 25 and 30 are secured inside the tank at some distance above the highest level a—a which the water is allowed to reach. They are therefore at all times maintained in a body of oil which contains little or no free water, the free water being caught and removed, as has just been explained, by the body of water in the bottom of the tank. An electric potential is maintained between these plates due to the secondary 51 of the transformer 50. This potential causes electric currents to flow through the emulsion between the plates and may conveniently have a magnitude somewhere between 5,000 and 20,000 volts.

For the purpose of preventing sparks in the tank when it is partially filled with oil, thus having a body of gas and air in the top, the safety switch 55 is provided, this safety switch only closing the circuit to the primary 53 of the transformer 50 when the tank is entirely filled, and opening it whenever the level of the oil in the tank falls so that an air space is formed in the top of the tank. In practice the safety switch 55 is never called upon to operate except at times when the treater is being started or when some accident occurs.

When the treater is in operation it is maintained full of oil and under some pressure by a suitable regulation of the valve 17. For the purpose of regulating the flow of water the members 70 to 73 are provided, the members 70 to 73 forming a continuous pipe, the upper level c—c of which can be readily regulated. As this pipe is in communication with the water in the bottom of the tank it is at all times filled with water and the column of water so formed is balanced against the combined water and oil inside the tank and the pressure produced by the valve 80. As a result of the differences in gravity between the oil and water there is a tendency for water to overflow or to rise above the level c—c whenever the water in the tank rises above the level a—a, the level of water falling below the level c—c whenever the water in the tank falls below the level b—b. In the event that water is supplied through the pipe 15 it is automatically drawn off through the pipe 70 as soon as sufficient accumulates to raise the level in the bottom of the tank to the line a—a and the water continues to flow through the pipe 70 until the level falls to the line b—b. During the operation of the treater there is a continual precipitation of water and more or less continuous drawing off of the water. The water which overflows from the top of the pipe 73 falls downwardly inside the column 71 into a drain 72.

It will be seen that my invention differs radically from the previous art. It is a well known fact that by passing an electric current through a body of emulsion one is able to change trapped water into free water. In the patents to Frederick G. Cottrell, Nos. 987,114, 987,115, 987,116, 987,117 and 994,377, a general theory of the action of electrical dehydrators is set forth. This theory is in short that upon the impressing of an electric motive force between electrodes immersed in oil there will inevitably result a number of water chains, the supposition being that the small water particles line themselves up in more or less continuous lines.

It is considered by Cottrell and others that the passage of current across these chains tends to break the oil film between the water globules and to cause them to coalesce into larger masses. I am not sure whether this action actually takes place or not. I am, however, sure that it is highly desirable to form a large number of the chains, and I am further sure that these chains when formed have a strong attraction for each other, which, to my mind, fully accounts for the coalescing action which I believe to be merely the union of a large number of chains of trapped particles into one chain in which all or part of the individual particles may be large enough to be designated as free water.

I have further found that the principal problem in the dehydration of oil is to prevent the introduction of masses of free water into the field between the electrodes. It will be noted that in my dehydrator a body of water is maintained in the bottom and all entering liquid must pass through this water. It will be further noted that by so passing the entering liquid I am able to catch and separate free water particles and thus prevent them from getting into the space between the electrodes.

I have further found that there is a continuous and rapid circulation around the plates 25 and 30 of my dehydrator, the oil rising rapidly through the space between the plates and passing downwardly through the space between the outside plates and the walls of the tank 11. This is due in part to the cooling action of the outer walls of the tank 11 which causes a slow settling of the oil near these walls, this oil being replaced by hot oil which arises between the plates 25 and 30. The circulation is further promoted by the formation of gas bubbles between the plates 25 and 30 which in rising greatly assist in circulating the liquid.

I have further found that any water particles which are of sufficient size to be designated as free water seem to be caught at the lowest point of travel of the circulating oil, or perhaps continue to fall until they reach the body of water in the bottom of the tank. In any case I have found that it is unnecessary to provide any means for preventing the formation of water chains as set forth in the Cottrell patents, and I have further found that after a short period of operation that the body of oil above the water is largely dehydrated so that at its worst it contains only a few per cent of water.

I have further found that there is a stratification of the oil, the dry and clean oil rising to the top and passing out through the outlet 18. I have been able in actual practice with a dehydrator of this type to remove all the water but a small fraction of one per cent from a very stubborn emulsion.

In the operation of all previous commercial types of dehydrators it has been common practice to dehydrate the oil in open tanks. As there is some liability of sparks passing across the top of the liquid in such tanks and as the mixture of oil, gas and air in the top of such tanks is highly inflammable, a considerable number of fires have resulted and there have been large property losses and some loss of life due to the operation of these open type dehydrators. I have found that it is entirely practical and indeed desirable to operate in closed tanks which are entirely filled with oil. It will be noted that in my dehydrator the outlet pipe is taken out of the extreme top and the safety switch 55 is provided so that there is no potential on any parts inside the dehydrator except when it is practically filled with oil. It is therefore impossible for explosions or fires to occur.

I have further found that it is highly desirable to keep the valve 80 partially closed for the purpose of maintaining a slight pressure upon the interior of the dehydrator. This I believe is due to the fact that there is a tendency for gas bubbles to form in the space between the plates 25 and 30 and by maintaining a pressure on the oil the formation of these bubbles is somewhat retarded.

What I claim is:—

1. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, one at least of said electrodes being electrically insulated from said tank; means for automatically withdrawing water from the bottom of said tank to maintain its upper surface constant between limits; an outlet pipe for withdrawing cleaned oil from the top of said tank; and means for impressing an electro-motive force between said electrodes.

2. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, one at least of said electrodes being electrically insulated from said tank; means for withdrawing water from the bottom of said tank; an outlet pipe for withdrawing cleaned oil from the top of said tank; a tight cover for said tank, said outlet pipe being so placed that the space below said cover must be practically filled with oil before oil can be withdrawn through said outlet pipe; and means for impressing an electro-motive force between said electrodes.

3. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, one at least of said electrodes being electrically insulated from said tank; means for withdrawing water from the bottom of said tank; an outlet pipe for withdrawing cleaned oil from the top of said tank; a tight cover for said tank, said outlet pipe being so placed that the space below said cover must be practically filled with oil before oil can be withdrawn through said outlet pipe; a transformer having each terminal of its secondary winding connected to one of said electrodes; a switch in the primary circuit of said transformer; means for opening said switch if the oil does not entirely fill the space below said cover; and means for causing an electric current to flow through said primary circuit.

4. An apparatus for dehydrating petroleum emulsions comprising a tank in the bottom of which a body of water may be retained; an inlet pipe so placed as to feed the oil to be treated to said body of water; a pair of electrodes supported in said tank above the upper surface of said water, one at least of said electrodes being electrically insulated from said tank; means for withdrawing water from the bottom of said tank; an outlet pipe for withdrawing cleaned oil from the top of said tank; and means for impressing an electromotive force between said electrodes.

5. An apparatus for dehydrating petroleum emulsions comprising a tank in the bottom of which a body of water may be retained; an inlet pipe so placed as to feed the oil to be treated to said body of water; a pair of electrodes supported in said tank above the upper surface of said water, one at least of said electrodes being electrically insulated from said tank; means for automatically withdrawing water from the bottom of said tank to maintain its upper surface constant between limits; an outlet pipe for withdrawing cleaned oil from the top of said tank; and means for impressing an electro-motive force between said electrodes.

6. An apparatus for dehydrating petroleum emulsions comprising a tank in the bottom of which a body of water may be retained; an inlet pipe so placed as to feed the oil to be treated to said body of water; a pair of electrodes supported in said tank above the upper surface of said water, one at least of said electrodes being electrically insulated from said tank; means for withdrawing water from the bottom of said tank; an outlet pipe for withdrawing cleaned oil from the top of said tank, said outlet being so placed as to withdraw oil from the extreme top of said tank; and means for impressing an electro-motive force between said electrodes.

7. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, said electrodes being so placed that there is a free circulation of oil between and around same, one at least of said electrodes being electrically insulated from said tank; means for automatically withdrawing water from the bottom of said tank to maintain its upper surface constant between limits; an outlet pipe for withdrawing cleaned oil from the top of said tank; and means for impressing an electro-motive force between said electrodes.

8. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, said electrodes being so placed that there is a free circulation of oil between and around same, one at least of said electrodes being electrically insulated from said tank; means for withdrawing water from the bottom of said tank; an outlet pipe for withdrawing cleaned oil from the top of said tank, said outlet being so placed as to withdraw oil from the extreme top of said tank; and means for impressing an electro-motive force between said electrodes.

9. An apparatus for dehydrating petroleum emulsions comprising a tank in the bottom of which a body of water may be retained; an inlet pipe so placed as to feed the oil to be treated to said body of water; a pair of electrodes supported in said tank above the upper surface of said water, said electrodes being so placed that there is a free circulation of oil between and around same, one at least of said electrodes being electrically insulated from said tank; means for automatically withdrawing water from the bottom of said tank to maintain its upper surface constant between limits; an outlet pipe for withdrawing cleaned oil from the top of said tank; and means for impressing an electro-motive force between said electrodes.

10. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, said electrodes each consisting of a plurality of parallel plates placed in a vertical plane, one at least of said electrodes being electrically insulated from said tank; means for withdrawing water from the bottom of said tank; an outlet pipe for withdrawing cleaned oil from the top of said tank; and means for impressing an electro-motive force between said electrodes.

11. An apparatus for dehydrating petroleum emulsions comprising a tank in the bottom of which a body of water may be retained; an inlet pipe so placed as to feed the oil to be treated to said tank; a pair of electrodes supported in said tank above the upper surface of said water, said electrodes each consisting of a plurality of parallel plates placed in a vertical plane, one at least of said electrodes being electrically insulated from said tank; means for withdrawing water from the bottom of said tank; an outlet pipe for withdrawing cleaned oil from the top of said tank; a tight cover for said tank, said outlet pipe being so placed that the space below said cover must be practically filled with oil before oil can be withdrawn through said outlet pipe; a transformer having each terminal of its secondary winding connected to one of said electrodes; a switch in the primary circuit of said transformer; means for opening said switch if the oil does not entirely fill the space below said cover; and means for causing an electric current to flow through said primary circuit.

12. The features of novelty substantially as described.

In testimony whereof, I have hereunto set my hand at Los Angeles, California, this 10th day of September, 1919.

FORD W. HARRIS.